(12) United States Patent
Hutchison

(10) Patent No.: US 11,066,593 B2
(45) Date of Patent: Jul. 20, 2021

(54) MICROEMULSION FLOWBACK AIDS FOR OILFIELD USES

(71) Applicant: STEPAN COMPANY, Northfield, IL (US)

(72) Inventor: John C. Hutchison, Lincolnwood, IL (US)

(73) Assignee: STEPAN COMPANY, Northfield, IL (US)

(*) Notice: Subject to any disclaimer, the term of this patent is extended or adjusted under 35 U.S.C. 154(b) by 0 days.

(21) Appl. No.: 15/931,665

(22) Filed: May 14, 2020

(65) Prior Publication Data

US 2020/0270510 A1    Aug. 27, 2020

Related U.S. Application Data

(63) Continuation of application No. PCT/US2018/060245, filed on Nov. 12, 2018.

(60) Provisional application No. 62/585,706, filed on Nov. 14, 2017.

(51) Int. Cl.
   *C09K 8/536* (2006.01)
   *C09K 8/60* (2006.01)
   *C09K 8/86* (2006.01)

(52) U.S. Cl.
   CPC ............. *C09K 8/536* (2013.01); *C09K 8/602* (2013.01); *C09K 8/86* (2013.01)

(58) Field of Classification Search
   CPC .......... C09K 8/26; C09K 8/524; C09K 8/536; C09K 8/584; C09K 8/602; C09K 8/68; C09K 8/86; C11D 17/0021; C11D 1/62; C11D 1/72; C11D 1/835; C11D 3/188; C11D 3/2093
   See application file for complete search history.

(56) References Cited

U.S. PATENT DOCUMENTS

| | | |
|---|---|---|
| 4,790,951 A | 12/1988 | Frieser et al. |
| 5,614,484 A | 3/1997 | Panandiker |
| 6,358,900 B1 | 3/2002 | Wigley et al. |
| 7,380,606 B2 | 6/2008 | Pursley et al. |
| 7,886,824 B2 | 2/2011 | Kakadjian et al. |
| 7,893,010 B2 | 2/2011 | Ali et al. |
| 7,998,911 B1 | 8/2011 | Berger et al. |
| 9,068,108 B2 | 6/2015 | Hill et al. |
| 9,222,013 B1 | 12/2015 | Champagne et al. |
| 2002/0069901 A1 | 6/2002 | Evers |
| 2003/0166472 A1 | 9/2003 | Pursley et al. |
| 2005/0245424 A1 | 11/2005 | Patel et al. |
| 2007/0029085 A1 | 2/2007 | Panga et al. |
| 2011/0021386 A1 | 1/2011 | Ali et al. |
| 2012/0149626 A1 | 6/2012 | Fluck et al. |
| 2013/0180723 A1 | 7/2013 | Crick et al. |
| 2013/0233559 A1 | 9/2013 | Van Zanten et al. |
| 2013/0261033 A1 | 10/2013 | Nguyen |
| 2013/0261227 A1 | 10/2013 | Nguyen |
| 2014/0262261 A1 | 9/2014 | Hill et al. |
| 2014/0274823 A1 | 9/2014 | Westenberg |
| 2015/0047849 A1 | 2/2015 | Wicker, Jr. et al. |
| 2015/0275634 A1 | 10/2015 | Nguyen et al. |
| 2015/0353815 A1 | 12/2015 | Kurkal-Siebert et al. |
| 2016/0024890 A1 | 1/2016 | Fursdon-Welsh et al. |
| 2016/0024891 A1 | 1/2016 | Fursdon-Welsh et al. |
| 2016/0138364 A1 | 5/2016 | Gamage et al. |
| 2017/0015898 A1 | 1/2017 | Beach et al. |
| 2017/0096594 A1 | 4/2017 | Champagne et al. |

FOREIGN PATENT DOCUMENTS

| | | |
|---|---|---|
| CA | 2904728 A1 | 3/2017 |
| WO | 2012059156 A1 | 5/2012 |
| WO | 2016041823 A2 | 3/2016 |
| WO | 2016134123 A1 | 8/2016 |
| WO | 2017059136 A1 | 4/2017 |

OTHER PUBLICATIONS

Safety Data Sheet of TOMADRY N-4 surfactant, revision date Feb. 2, 2016.*

EVONIK's VARIQUAT T 1210 NS, retrieved online on Dec. 21, 2020, https://corporate.evonik.com/en/products/search-products/pages/product-details.aspx?productId=79657&letter=V.*

A. Mahmoudkhani et al., "Microemulsions as Flowback Aids for Enhanced Oil and Gas Recovery after Fracturing, Myth or Reality: A Turnkey Study to Determine the Features and Benefits," SPE-173729-MS, SPE Symposium on Oilfield Chemistry, The Woodlands, TX, Apr. 13-15, 2015, pp. 1-18.

D. Agee et al., "Post-Fracturing Fluid-Recovery Enhancement with Microemulsion," SPE 128098, SPE International Symposium and Exhibition on Formation Damage Control, Lafayette, LA, Feb. 10-12, 2010, (abstract only).

(Continued)

*Primary Examiner* — Frances Tischler

(74) *Attorney, Agent, or Firm* — Dilworth IP, LLC

(57) ABSTRACT

Flowback aid mixtures and oil-in-water microemulsions produced by combining an aqueous brine with the flowback aid mixtures are disclosed. The flowback aid mixture comprises an oil, a fatty alcohol ethoxylate, and a quaternized fatty amine ethoxylate. The amount of oil is less than or equal to 12 wt. % based on the amount of flowback aid mixture. The microemulsions have a surface tension at 25° C. less than 30 mN/m and a Z-average particle size as determined by dynamic light scattering at 25° C. of less than or equal to 10 nm. Also disclosed are processes that utilize the flowback aid mixtures. In one process, the mixture is introduced into a subterranean formation and is combined prior to or during its introduction into the formation with a formation brine, process water, or both to give the microemulsion. In one hydraulic fracturing process for recovering gas, oil, or both, a fracturing fluid and the flowback aid are co-injected into a subterranean formation to give the microemulsion.

20 Claims, No Drawings

(56) References Cited

OTHER PUBLICATIONS

International Search Report dated Feb. 15, 2019 in PCT/US2018/060245, 3 pages.

Paul R. Howard et al., "Comparison of Flowback Aids: Understanding Their Capillary Pressure and Wetting Properties", Aug. 2010 SPE Production & Operations, pp. 376-387.

G.S. Penny et al., "Enhanced Load Water-Recovery Technique Improves Stimulation Results", Copyright 1983 Society of Petroleum Engineers of AIME, pp. 1-12.

Hui Zhang et al., "Unique Flow-Back Chemistry for Enhancing Productivity of Low-Permeability Reservoir", Copyright 2012, IADC/SPE Asia Pacific Drilling Technology Conference and Exhibition.

\* cited by examiner

MICROEMULSION FLOWBACK AIDS FOR OILFIELD USES

FIELD OF THE INVENTION

The invention relates to compositions useful as flowback aids for oilfield applications.

BACKGROUND OF THE INVENTION

Hydraulic fracturing is used to stimulate the production of oil and gas from a portion of a subterranean formation or reservoir. Fresh water, "produced" water from a formation, or some combination thereof is injected into the formation at high flow rates to create or enhance fractures in the formation. "Proppants" such as silicas are included to keep fractures open enough to allow oil, gas, and produced water to be recovered.

Flowback aids are used to enhance oil and gas production and help with clean-up after well stimulation by hydraulic fracturing and other similar processes. The flowback aids help fluid return from the reservoir and help to minimize damage to the formation. Flowback aids are typically surfactants, cosolvents, or combinations of these, sometimes in the form of a microemulsion. For general discussions of microemulsion flowback aids, see, e.g., A. Mahmoudkhani et al., "Microemulsions as Flowback Aids for Enhanced Oil and Gas Recovery after Fracturing, Myth or Reality: A Turnkey Study to Determine the Features and Benefits," SPE-173729-MS, SPE Symposium on Oilfield Chemistry, The Woodlands, Tex., 13-15 Apr. 2015 and D. Agee et al., "Post-Fracturing Fluid-Recovery Enhancement with Microemulsion," SPE 128098, SPE International Symposium and Exhibition on Formation Damage Control, Lafayette, La., 10-12 Feb. 2010.

The microemulsions commonly include one or more surfactants, brine, an oil, and one or more cosolvents. Terpenes (e.g., d-limonene) and other hydrocarbons have been taught as suitable oils for the microemulsions (see, e.g., U.S. Pat. Nos. 9,222,013; 9,068,108; 7,893,010; and 7,886,824). Nonionic surfactants, particularly fatty alcohol ethoxylates, are taught as a surfactant component (see, e.g., U.S. Pat. Nos. 9,222,013; 7,998,911; 7,886,824; and 7,380,606).

Quaternized fatty amine ethoxylates, a class of cationic surfactants, have been mentioned for use as "ionic liquids" for treating proppants (see U.S. Publ. No. 2015/047849). More recently, quaternized fatty amine ethoxylates have been disclosed as components of microemulsions when used in combination with an EO/PO block copolymer for preventing or removing gelled layers in an oil and/or gas well (U.S. Publ. Nos. 2016/0024890 and 2016/0024891).

The industry would benefit from the availability of flowback aid mixtures that, when combined with brines or other process waters of various ionic strength, can generate precipitate-free, oil-in-water microemulsions having surface tensions less than 30 mN/m and Z-average particle sizes (as measured by dynamic light scattering) of less than 10 nm at 25° C. Ideally, the microemulsions could use a variety of different oils and would have desirable attributes over a wide range of oil loadings.

SUMMARY OF THE INVENTION

In one aspect, the invention relates to a composition comprising an oil-in-water microemulsion. The microemulsion is produced by combining an aqueous brine with a flowback aid mixture. The flowback aid mixture comprises an oil, a fatty alcohol ethoxylate, and a quaternized fatty amine ethoxylate. The amount of oil is less than or equal to 12 wt. % based on the amount of flowback aid mixture. The microemulsion has a surface tension at 25° C. less than 30 mN/m and a Z-average particle size as determined by dynamic light scattering at 25° C. of less than or equal to 10 nm.

In another aspect, the invention relates to a composition suitable for use as a flowback aid for oilfield applications. The composition comprises an oil, a fatty alcohol ethoxylate, and a quaternized fatty amine ethoxylate. The amount of oil is less than or equal to 12 wt. % based on the amount of composition. When combined with an aqueous brine, the composition provides a microemulsion having a surface tension at 25° C. less than 30 mN/m and a Z-average particle size as determined by dynamic light scattering at 25° C. of less than or equal to 10 nm.

The invention includes a process which comprises introducing into a subterranean formation a flowback aid mixture. The flowback aid mixture comprises an oil, a fatty alcohol ethoxylate, and a quaternized fatty amine ethoxylate. The amount of oil is less than or equal to 12 wt. % based on the amount of flowback aid mixture. The mixture is combined prior to or during its introduction into the formation with a formation brine, process water, or both to give a microemulsion having a surface tension at 25° C. less than 30 mN/m and a Z-average particle size as determined by dynamic light scattering at 25° C. of less than or equal to 10 nm.

In yet another aspect, the invention relates to a hydraulic fracturing process for recovering gas, oil, or both. In this process, the improvement comprises co-injecting into a subterranean formation a fracturing fluid and a flowback aid mixture. The flowback aid mixture comprises an oil, a fatty alcohol ethoxylate, and a quaternized fatty amine ethoxylate. The amount of oil is less than or equal to 12 wt. % based on the amount of flowback aid mixture. The mixture combines with the fracturing fluid and formation brine to give a microemulsion having a surface tension at 25° C. less than 30 mN/m and a Z-average particle size as determined by dynamic light scattering at 25° C. of less than or equal to 10 nm.

DETAILED DESCRIPTION OF THE INVENTION

A. Flowback Aid Mixtures

In one aspect, the invention relates to a composition suitable for use as a flowback aid for oilfield applications. The composition comprises an oil, a fatty alcohol ethoxylate, and a quaternized fatty amine ethoxylate.

1. The Oil

In the context of the flowback aid mixtures, "oil" refers to an organic compound or mixture of compounds capable for forming an oil-in-water emulsion when combined with an aqueous brine and the other components of the flowback aid mixture.

Suitable oils include terpenes, especially monoterpenes, and hydrocarbons (e.g., kerosene, xylenes, light mineral oils, paraffin oils, and the like). By "monoterpene," we mean one or more compounds derived from two isoprene units that may be cyclic or acyclic and are either hydrocarbons or have hydroxyl, ester, aldehyde, or ketone functionality. Although a single monoterpene compound can be used, suitable monoterpenes are more commonly complex mixtures of terpene or terpenoid compounds that occur in nature or are produced synthetically. Examples of such naturally occurring mixtures are lemon oil, pine oil, lavender oil, and the like. The monoterpenes can include, for example, limonene, α-pinene, β-pinene, carene, α-terpinene, γ-terpinene, α-terpineol, camphene, p-cymene, myrcene, sabinene, and the like, and mixtures thereof. Lemon oil, for instance, contains about 90% monoterpene hydrocarbons, mostly limonene, with lesser amounts of γ-terpinene, α-pinene, and β-pinene. Limonene, lemon oil, β-pinene, and pine oil are particularly preferred monoterpenes. Higher terpenes (i.e., sesquiterpenes, diterpenes, etc.) can also be used. For additional examples of suitable monoterpenes, see U.S. Pat. Nos. 4,790,951; 5,614,484; and U.S. Pat. Appl. Publ. Nos. 2002/0069901 and 2005/0245424, the teachings of which are incorporated herein by reference.

Suitable oils also include $C_6$-$C_{30}$ fatty alkyl esters, especially $C_6$-$C_{30}$ fatty methyl esters. The $C_6$-$C_{30}$ fatty alkyl esters are generally available from the corresponding mono- di- or triglycerides by transesterification with an alcohol, preferably methanol or ethanol. Preferred fatty alkyl esters include $C_8$-$C_{10}$ fatty methyl esters such as STEPAN® C-25 and $C_{16}$-$C_{18}$ fatty methyl esters such as STEPAN® C-65.

The amount of oil used is less than or equal to 12 wt. %, or from 1 to 12 wt. %, or from 2 to 10 wt. %, or from 2 to 8 wt. %, based on the amount of flowback aid mixture. In general, when the flowback aid contains more than 12 wt. % of the oil, it is difficult to produce a microemulsion having both a surface tension at 25° C. less than 30 mN/m and a Z-average particle size as determined by dynamic light scattering at 25° C. of less than or equal to 10 nm.

2. The Fatty Alcohol Ethoxylate

Suitable fatty alcohol ethoxylates are reaction products of a linear or branched $C_6$-$C_{18}$ alcohol having an average of 1 to 100 molar equivalents of EO units. Preferred fatty alcohol ethoxylates are reaction products of linear $C_9$-$C_{15}$ alcohols having an average of 1 to 15 EO units. More preferred are reaction products of linear $C_9$-$C_{11}$ alcohols having an average of 2 to 5 EO units. In a preferred aspect, the fatty alcohol ethoxylate is a $C_9$-$C_{11}$ alcohol ethoxylate having an average of 3 to 4 EO units.

Suitable fatty alcohol ethoxylates are commercially available, for example, from Stepan Company under the BIO-SOFT® mark. Examples include BIO-SOFT® N91-3.5, BIO-SOFT® N1-3, BIO-SOFT® N91-6, BIO-SOFT® N91-2.5, and the like.

The amount of fatty alcohol ethoxylate needed depends on many factors, including the identity of the fatty alcohol ethoxylate, the nature of the oil, the nature of the quaternized fatty amine ethoxylate, and other factors. Generally, however, the flowback aid mixture will contain 30 to 70 wt. %, 40 to 60 wt. %, or 45 to 55 wt. % of the fatty alcohol ethoxylate. In some aspects, the fatty alcohol ethoxylate and the quaternized fatty amine ethoxylate are used in roughly equal amounts by weight.

3. The Quaternized Fatty Amine Ethoxylate

The flowback aid mixture includes a quaternized fatty amine ethoxylate. Suitable quaternized fatty amine ethoxylates can be produced by reacting fatty amine ethoxylates with a quaternizing agent. In turn, the fatty amine ethoxylates are conveniently produced by reacting fatty amines with a desired number of equivalents of ethylene oxide.

In some aspects, the quaternized fatty amine ethoxylate is based on a $C_8$ to $C_{30}$ fatty amine, preferably a $C_{12}$ to $C_{20}$ or a $C_{14}$ to $C_{18}$ fatty amine. In some aspects, tallowamine is used as a starting material for making the quaternized fatty amine ethoxylates. Tallowamine is commonly made by reacting a mixture of mostly Cm saturated and $C_{18}$ saturated and unsaturated fatty acids with ammonia to give a nitrile, followed by hydrogenation to the primary amines. Other fatty amines can be made analogously. In some aspects, the quaternized fatty amine ethoxylate has an average of 1 to 100 EO units, 5 to 50 EO units, or more preferably 8 to 20 EO units. Any suitable reagent can be used to quaternize the fatty amine ethoxylate. Suitable quaternizing methods and reagents are well known in the art. Common reagents include, for example, alkyl halides (methyl chloride, methyl bromide), dialkyl sulfates, carbonates, or phosphates (dimethyl sulfate, diethyl sulfate, dimethyl carbonate), benzyl chloride, acetyl chloride, ethylene oxide, and the like. Dimethyl sulfate is a preferred quaternizing agent.

The amount of quaternized fatty amine ethoxylate needed depends on many factors, including the identity of the quaternized fatty amine ethoxylate, the nature of the oil, the nature of the fatty alcohol ethoxylate, and other factors. Generally, however, the flowback aid mixture will contain 30 to 70 wt. %, 40 to 60 wt. %, or 45 to 55 wt. % of the quaternized fatty amine ethoxylate. As indicated above, in some aspects, the quaternized fatty amine ethoxylate and the fatty alcohol ethoxylate are used in roughly equal amounts by weight.

4. Cosolvent

In some aspects, the flowback aid mixture includes a cosolvent. Suitable cosolvents are alcohols, glycols, ethers, esters, glycol ethers, glycol esters, amides, and the like. Alcohols, particularly $C_3$ to $C_8$ alcohols are generally preferred. Examples include isopropanol, 1-butanol, 2-butanol, cyclohexanol, 2-ethylhexyl alcohol, ethylene glycol, propylene glycol, diethylene glycol, propylene glycol methyl ether, propylene glycol methyl ether acetate, N-methyl-2-pyrrolidone, and the like. Alkylene glycols, particularly propylene glycol, are preferred cosolvents. When a cosolvent is included, the amount used can vary over a wide range. When used, however, the cosolvent will generally be present in an amount within the range of 15 to 35 wt. % or 20 to 30 wt. % based on the amount of flowback aid mixture.

B. Oil-in-Water Microemulsions

Microemulsions useful herein are oil-in-water microemulsions produced by dilution of a flowback aid mixture with an aqueous brine.

1. Brines

The aqueous brine can be a naturally occurring formation brine, process water introduced into the formation, or some combination thereof. The salinity of a formation brine, usually expressed in terms of "total dissolved solids" (TDS), will generally be characteristic of the formation. The salinity of process water is controlled to adjust the overall salinity level within desired bounds. In some cases, the process water will be fresh water that is combined with formation brine or other process water.

In some aspects, the aqueous brine is a dilute solution comprising an alkali metal halide such as sodium chloride or potassium chloride, such as 1 wt. % to 2 wt. % KCl solution. In some aspects, the aqueous brine is seawater, which contains 2 wt. % to 5 wt. % TDS, typically about 3.5 wt. %. Aqueous brines will usually also contain lesser concentrations of divalent ions from calcium salts, magnesium salts, or both.

In some aspects, the brine makes up at least 50 wt. % of the microemulsion. In other aspects, the brine makes up at least 65 wt. % or at least 80 wt. % of the microemulsion.

2. Preparation of the Microemulsion

In some aspects, the microemulsion will be prepared prior to injection into a subterranean formation. In this case, the flowback aid is combined with formation brine, process water, or both under conditions effective to produce an oil-in-water microemulsion having the required properties discussed below. The microemulsion is then injected into the formation, usually along with process water, formation brine, or some combination thereof.

In other aspects, the microemulsion is generated in situ in the formation following injection of the flowback aid mixture. In this case, the flowback aid mixture is introduced into the formation in an amount effective to produce an oil-in-water microemulsion having the required properties discussed below.

3. Properties of the Microemulsion

Oil-in-water microemulsions are dispersions of oil droplets (discontinuous phase) in an immiscible aqueous phase (continuous phase). The oil droplets have a measurable "particle" size as indicated below. Microemulsions are transparent because their particle size is less than the wavelengths of visible light. Microemulsions are homogeneous and thermodynamically stable, and they are characterized by good clarity, low surface tensions, good shelf stability, and ease of preparation.

In particular, the oil-in-water microemulsions have a surface tension at 25° C. less than 30 mN/m. Surface tension can be measured by any acceptable method. In one convenient method, surface tension determinations are made using the Wilhelmy plate method. A suitable instrument such as a Kruss K100 surface tensiometer is used.

The oil-in-water microemulsions have a Z-average particle size as determined by dynamic light scattering at 25° C. of less than or equal to 10 nm. Preferably, the Z-average particle size will range from 1 to 10 nm, from 1 to 9 nm, or from 2 to 8 nm. Dynamic light scattering can be used to determine Z-average particle size with any suitable instrument, such as a Malvern Zetasizer Nano ZS instrument.

In some aspects, the oil-in-water microemulsions have interfacial tensions determined in decane at 25° C. less than 10 mN/m. Interfacial tension determinations are conveniently made using the pendant drop method and a suitable instrument such as a Kruss DSA20 pendant drop tensiometer.

In some aspects, the microemulsion has a viscosity less than 500 cP at 25° C. In other aspects, the microemulsion has a viscosity less than 100 cP at 25° C. or less than 50 cP at 25° C.

C. Processes

In one aspect, the invention relates to a process which comprises introducing into a subterranean formation a flowback aid mixture comprising an oil, a fatty alcohol ethoxylate, and a quaternized fatty amine ethoxylate. Each of the components of the flowback aid mixture has been previously discussed. The amount of oil is less than or equal to 12 wt. % based on the amount of flowback aid mixture. In this process, the flowback aid mixture is combined prior to or during its introduction into the formation with a formation brine, process water, or both. The result is a microemulsion having a surface tension at 25° C. less than 30 mN/m and a Z-average particle size as determined by dynamic light scattering at 25° C. of less than or equal to 10 nm.

In another aspect, the invention relates to a hydraulic fracturing process for recovering gas, oil, or both. In this process, the improvement comprises co-injecting into a subterranean formation a fracturing fluid and a flowback aid mixture comprising an oil, a fatty alcohol ethoxylate, and a quaternized fatty amine ethoxylate. Each of these components has been previously described. The amount of oil is less than or equal to 12 wt. % based on the amount of flowback aid mixture. The flowback aid mixture combines with the fracturing fluid and formation brine to give a microemulsion having a surface tension at 25° C. less than 30 mN/m and a Z-average particle size as determined by dynamic light scattering at 25° C. of less than or equal to 10 nm. Preferably, the flowback aid mixture is diluted to a concentration within the range of 500 ppm to 5000 ppm after its combination with fracturing fluid and formation brine.

D. Other Uses for the Flowback Aid Mixtures and Microemulsions

In addition to the uses described above, the flowback aid mixtures, microemulsions, or both can be used for the following applications: cleaning of oilfield equipment, drilling, mud displacement, cementing, perforating, store fluids, kill fluids, other cleaning applications, enhanced oil recovery, IOR fluids, well casing cleaners, demulsifiers, and consumer cleaners.

The following examples merely illustrate the invention; the skilled person will recognize many variations that are within the spirit of the invention and scope of the claims.

Microemulsion Preparation

Microemulsions are prepared using Mixture A, which is a blend of fatty alcohol ethoxylate surfactant (40 to 60 wt. %), fatty ammonium methyl sulfate cationic surfactant (40 to 60 wt. %), and propylene glycol (15 to 25 wt. %). Mixture A is combined with an oil (d-limonene, STEPAN® C-25 $C_8$-$C_{10}$ methyl esters, or STEPAN® C-65 $C_{16}$-$C_{18}$ methyl esters) and water. The targeted actives (surfactants+oil) level is 18 to 20 wt. %. The amount of oil used varies from 0.5 wt. % to 14.4 wt. % based on the combined amount of surfactants+oil as shown in Table 1.

In each case, surfactant is dispensed into a scintillation vial and weighed. The oil is then quantitatively added and mixed, followed by addition of filtered, simulated process water. In most cases, the resulting microemulsion is a clear, colorless, water-thin solution. No gel phase forms when the surfactant/oil mixture is diluted with water. In one example, the larger proportion of STEPAN C-65 fails to provide a homogeneous mixture. A comparative example is prepared without any oil present.

Dilutions to produce microemulsions containing 0.04 wt. % or 0.50 wt. % of actives are produced from the 18-20 wt. % actives mixtures by diluting the more concentrated mixture with filtered brine (2.0 wt. % KCl, 1.0 wt. % KCl, or 3.5 wt. % seawater) as indicated in Table 2. In each case, dilution provides a clear, colorless, water-thin, oil-in-water microemulsion.

Dynamic light scattering is used to measure a Z-average particle (i.e., droplet) size for each of the diluted microemulsion samples listed in Table 3. Z-average size (also known as the "cumulants mean") determinations are made using a Malvern Zetasizer Nano ZS instrument. For some samples, the particle size is measured as a function of temperature. The observed particle sizes generally range from about 7 nm to about 10 nm when the amount of oil in the microemulsion actives is less than about 12 wt. % based on the combined amount of surfactants and oil. In general, as temperature is increased, the observed particle size increases. The polydispersity index (PDI) is also reported. The PDI values in Table 3 are all less than 0.1, which is consistent with a narrow, monomodal distribution of sizes.

Table 4 shows that oil content impacts the observed Z-average particle size. When other factors are held constant (same temperature, same brine), the particle size of the oil droplets increases as the oil content of the microemulsion is increased. The results demonstrate that useful oil-in-water microemulsions having Z-average particle sizes less than 10 nm and potentially valuable as flowback aids for oilfield applications can be produced using combinations of an oil (particularly d-limonene or a fatty methyl ester), water, a fatty alcohol ethoxylate (nonionic) surfactant, and a fatty ammonium methyl sulfate (cationic) surfactant. Results indicate that the Z-average particle size can be held to 10 nm or less when the oil content of the microemulsion is limited to about 12 wt. % based on the combined amounts of oil and surfactants in the microemulsion.

Surface tension (mN/m) and interfacial tension (mN/m) for some of the diluted microemulsions are reported in Table 5. Each of the microemulsions evaluated has a surface tension below 30 mN/m and an interfacial tension below 10 mN/m. Surface tension determinations are made using the Wilhelmy plate method with a Kruss K100 surface tensiometer at 25° C. Each determination is the average of three measurements. In general, the surface tensions increase linearly as function of oil content within the measured range of oil contents. Interfacial tension determinations against decane are made using the pendant drop method with a Kruss DSA20 pendant drop tensiometer at 25° C. Results are reported in Table 5. The compositions have IFT values at 25° C. below 10 mN/m within the measured range of oil contents.

TABLE 1

Microemulsions (undiluted)

| ID | Mixture A, g | d-limonene, g | Stepan C-25, g | Stepan C-65, g | water, g | actives + oil, wt. % | oil/[actives + oil], wt. % | Comment |
|---|---|---|---|---|---|---|---|---|
| A1 | 1.98 | 0.018 | — | — | 7.97 | 20.0 | 0.90 | clear, colorless, water-thin |
| A2 | 1.98 | 0.019 | — | — | 7.98 | 20.0 | 0.95 | clear, colorless, water-thin |
| A3 | 1.92 | 0.100 | — | — | 8.01 | 20.1 | 4.9 | clear, colorless, water-thin |
| A4 | 1.81 | 0.202 | — | — | 8.04 | 20.0 | 10.0 | clear, colorless, water-thin |
| A5 | 1.83 | 0.201 | — | — | 8.05 | 20.1 | 9.9 | clear, colorless, water-thin |
| B1 | 2.03 | — | 0.01 | — | 7.99 | 20.3 | 0.56 | clear, colorless, water-thin |
| B2 | 2.02 | — | 0.10 | — | 8.01 | 20.9 | 4.9 | clear, colorless, water-thin |
| B3 | 1.99 | — | 0.20 | — | 8.05 | 21.4 | 9.2 | clear, colorless, water-thin |
| C1 | 2.00 | — | — | 0.01 | 7.99 | 20.1 | 0.60 | clear, colorless, water-thin |
| C2 | 2.01 | — | — | 0.10 | 8.01 | 20.9 | 4.9 | clear, colorless, water-thin |
| C3 | 2.00 | — | — | 0.20 | 8.02 | 21.5 | 9.3 | clear, colorless, water-thin |
| C4 | 1.92 | — | — | 0.25 | 8.49 | 20.3 | 11.7 | clear, colorless, water-thin |
| C5* | 1.81 | — | — | 0.30 | 8.12 | 20.6 | 14.4 | not homogeneous |
| C6 | 3.59 | — | — | 0.022 | 16.39 | 18.0 | 0.60 | clear, free-flowing liquid |
| C7 | 3.43 | — | — | 0.18 | 16.37 | 18.0 | 5.1 | clear, free-flowing liquid |
| C8 | 3.59 | — | — | 0.018 | 16.40 | 18.0 | 0.49 | clear, free-flowing liquid |
| C9 | 3.42 | — | — | 0.18 | 16.39 | 18.0 | 5.0 | clear, free-flowing liquid |
| C10 | 3.60 | — | — | 0.022 | 16.39 | 18.0 | 0.60 | clear, free-flowing liquid |
| C11 | 3.45 | — | — | 0.18 | 16.38 | 18.1 | 5.0 | clear, free-flowing liquid |
| C12 | 3.58 | — | — | 0.019 | 16.40 | 18.0 | 0.52 | clear, free-flowing liquid |
| C13 | 3.42 | — | — | 0.18 | 16.40 | 18.0 | 5.0 | clear, free-flowing liquid |
| G1* | 2.05 | — | — | — | 7.99 | 20.4 | 0 | clear, colorless, water-thin |

*Comparative example

TABLE 2

Dilutions

| ID | ME | brine | ME actives, wt. % | Comment |
|---|---|---|---|---|
| A1-01 | A1 | 2% KCl | 0.50 | clear, colorless, water-thin |
| A1-02 | A1 | 2% KCl | 0.04 | clear, colorless, water-thin |
| A1-03 | A1 | 1% KCl | 0.50 | clear, colorless, water-thin |
| A2-01 | A2 | 2% KCl | 0.50 | clear, colorless, water-thin |
| A4-01 | A4 | 2% KCl | 0.51 | clear, colorless, water-thin |
| A4-02 | A4 | 2% KCl | 0.04 | clear, colorless, water-thin |
| A5-01 | A5 | 2% KCl | 0.50 | clear, colorless, water-thin |
| B1-01 | B1 | 2% KCl | 0.50 | clear, colorless, water-thin |
| B3-01 | B3 | 2% KCl | 0.50 | clear, colorless, water-thin |
| C1-01 | C1 | 2% KCl | 0.50 | clear, colorless, water-thin |
| C1-01-B | C1 | 2% KCl | 0.50 | clear, free-flowing liquid |
| C1-02 | C1 | 1% KCl | 0.50 | clear, colorless, water-thin |
| C1-03 | C1 | 3.5% seawater | 0.50 | clear, colorless, water-thin |
| C2-01 | C2 | 2% KCl | 0.50 | clear, colorless, water-thin |
| C2-02 | C2 | 1% KCl | 0.50 | clear, colorless, water-thin |
| C2-03 | C2 | 3.5% seawater | 0.51 | clear, colorless, water-thin |
| C3-01 | C3 | 2% KCl | 0.50 | clear, colorless, water-thin |
| C3-01-B | C3 | 2% KCl | 0.50 | clear, free-flowing liquid |
| C3-02 | C3 | 1% KCl | 0.50 | clear, colorless, water-thin |
| C3-03 | C3 | 3.5% seawater | 0.50 | clear, colorless, water-thin |
| C4-01 | C4 | 2% KCl | 0.50 | clear, colorless, water-thin |
| C4-02 | C4 | 1% KCl | 0.50 | clear, colorless, water-thin |
| C6-01 | C6 | 2% KCl | 0.50 | clear, free-flowing liquid |
| C7-01 | C7 | 2% KCl | 0.50 | clear, free-flowing liquid |
| C8-01 | C8 | 2% KCl | 0.50 | clear, free-flowing liquid |
| C9-01 | C9 | 2% KCl | 0.50 | clear, free-flowing liquid |
| C10-01 | C10 | 2% KCl | 0.50 | clear, free-flowing liquid |
| C11-01 | C11 | 2% KCl | 0.50 | clear, free-flowing liquid |
| C12-01 | C12 | 2% KCl | 0.50 | clear, free-flowing liquid |
| C13-01 | C13 | 2% KCl | 0.50 | clear, free-flowing liquid |
| G1-01* | G1 | 2% KCl | 0.50 | clear, colorless, water-thin |
| G1-01-B* | G1 | 2% KCl | 0.49 | clear, free-flowing liquid |
| G1-02* | G1 | 1% KCl | 0.50 | clear, colorless, water-thin |

*Comparative example

TABLE 3

Z-Average Particle Size of Diluted MEs

| ID | Temp, ° C. | Z-avg particle size, nm | PDI |
|---|---|---|---|
| A2-01 | 25 | 8.08 | 0.08 |
| A2-01 | 35 | 8.68 | 0.09 |
| A2-01 | 45 | 9.12 | 0.09 |
| A2-01 | 50 | 9.36 | 0.08 |
| A5-01 | 25 | 8.47 | 0.07 |
| B1-01 | 25 | 8.23 | 0.05 |
| C1-01 | 25 | 8.15 | 0.04 |
| C1-01 | 25 | 7.97 | 0.04 |
| C1-01 | 30 | 8.44 | 0.05 |
| C1-01 | 30 | 8.37 | 0.05 |
| C1-01 | 30 | 8.33 | 0.08 |
| C1-01 | 35 | 8.61 | 0.07 |
| C1-01 | 40 | 8.83 | 0.08 |
| C1-01 | 45 | 9.16 | 0.08 |
| C1-01 | 50 | 9.32 | 0.07 |
| C1-03 | 25 | 9.31 | 0.06 |
| C1-03 | 25 | 9.31 | 0.08 |
| C1-03 | 25 | 9.18 | 0.09 |
| C1-03 | 25 | 9.08 | 0.07 |
| C2-01 | 25 | 8.54 | 0.04 |
| C2-02 | 25 | 8.50 | 0.08 |
| C2-03 | 25 | 9.35 | 0.04 |
| C2-03 | 25 | 9.42 | 0.06 |
| C2-03 | 25 | 9.19 | 0.04 |
| C3-01 | 25 | 9.23 | 0.02 |
| C3-01 | 25 | 9.24 | 0.02 |
| C3-01 | 30 | 9.39 | 0.02 |
| C3-01 | 35 | 9.48 | 0.02 |
| C3-01 | 40 | 9.62 | 0.02 |
| C3-01 | 45 | 9.83 | 0.03 |
| C3-01 | 50 | 10.0 | 0.05 |
| C3-02 | 25 | 9.27 | 0.06 |
| C3-03 | 25 | 10.3 | 0.06 |
| C3-03 | 25 | 10.1 | 0.04 |
| C3-03 | 25 | 10.0 | 0.04 |
| C3-03 | 25 | 10.1 | 0.04 |
| C4-01 | 25 | 10.2 | 0.07 |
| C4-02 | 25 | 7.66 | 0.03 |
| G1-01 | 25 | 8.18 | 0.08 |
| G1-01 | 25 | 8.22 | 0.06 |

TABLE 4

Z-Average Particle Size as a Function of Oil Content for Stepan C-65 at 25° C.

| | | Z-Average particle size, nm | | |
|---|---|---|---|---|
| ID | oil/[oil + actives], wt. % | 2 wt. % KCl | 1 wt. % KCl | 3.5 wt. % seawater |
| C1 | 0.6 | 8.06 | | |
| C2 | 4.9 | 8.54 | 8.50 | 9.32 |
| C3 | 9.3 | 9.23 | 9.27 | 10.1 |
| C4 | 11.7 | 10.2 | | |

TABLE 5

Surface Tension (ST) and Interfacial Tension (IFT) Results from Diluted Microemulsions

| ID | oil/[oil + actives], wt. % | IFT (mN/m) | ST (mN/m) |
|---|---|---|---|
| C1-01-B | 0.60 | 8.63 | 26.7 |
| C3-01-B | 9.3 | 8.93 | 28.0 |
| C6-01 | 0.60 | 7.74 | 26.8 |
| C7-01 | 5.1 | 9.07 | 27.5 |
| C8-01 | 0.49 | 8.52 | 26.7 |
| C9-01 | 5.0 | 9.38 | 27.3 |
| C10-01 | 0.6 | 8.08 | 26.8 |
| C11-01 | 5.0 | 8.65 | 27.5 |
| C12-01 | 0.52 | 7.68 | 26.7 |
| C13-01 | 5.0 | 9.02 | 27.5 |
| G1-01-B* | 0 | 7.21 | 26.6 |

*Comparative example

The preceding examples are meant only as illustrations; the following claims define the scope of the invention.

I claim:

1. A composition comprising an oil-in-water microemulsion produced by combining an aqueous brine with a flowback aid mixture which comprises:
   (a) an oil selected from the group consisting of hydrocarbons, terpenes, and $C_6$-$C_{30}$ fatty alkyl esters;
   (b) a fatty alcohol ethoxylate; and
   (c) a quaternized fatty amine ethoxylate;
   wherein the aqueous brine comprises naturally occurring formation brine, process water, seawater, or a combination thereof;
   wherein the amount of oil is within the range of 1 to 12 wt. % based on the amount of flowback aid mixture, and the microemulsion has a surface tension at 25° C. of less than 30 mN/m and a Z-average particle size as determined by dynamic light scattering at 25° C. of less than or equal to 10 nm.

2. The composition of claim 1 wherein the microemulsion has an interfacial tension at 25° C. against decane of less than or equal to 10 mN/m.

3. The composition of claim 1 wherein the microemulsion has a viscosity less than 50 cP at 25° C.

4. The composition of claim 1 wherein at least 50 wt. % of the microemulsion is the brine.

5. The composition of claim 1 wherein the oil is selected from the group consisting of terpenes and $C_6$-$C_{30}$ fatty methyl esters.

6. The composition of claim 1 wherein the oil is d-limonene.

7. The composition of claim 1 wherein the fatty alcohol ethoxylate is a $C_9$-$C_{11}$ alcohol ethoxylate having an average of 3 to 4 EO units.

8. The composition of claim 1 wherein the quaternized fatty amine ethoxylate is a quaternized tallowamine EO ethoxylate having an average of 8 to 20 EO units.

9. The composition of claim 1 wherein the microemulsion further comprises propylene glycol.

10. The composition of claim 1 wherein the brine is seawater.

11. The composition of claim 1 wherein the brine comprises 1 to 2 wt. % KCl.

12. The composition of claim 1 wherein the flowback aid mixture comprises 1 to 12 wt. % of the oil, 30 to 70 wt. % of the fatty alcohol ethoxylate, and 30 to 70 wt. % of the quaternized fatty amine ethoxylate.

13. A composition suitable for use as a flowback aid for oilfield applications, the composition comprising:
   (a) an oil selected from the group consisting of hydrocarbons, terpenes, and $C_6$-$C_{30}$ fatty alkyl esters;
   (b) a fatty alcohol ethoxylate; and
   (c) a quaternized fatty amine ethoxylate;
   wherein the amount of oil is within the range of 1 to 12 wt. % based on the amount of composition, and the composition, when combined with an aqueous brine, provides a microemulsion having a surface tension at 25° C. of less than 30 mN/m and a Z-average particle size as determined by dynamic light scattering at 25° C. of less than or equal to 10 nm; wherein the aqueous brine comprises naturally occurring formation brine, process water, seawater, or a combination thereof.

14. The composition of claim 13 wherein the oil is selected from the group consisting of terpenes and $C_6$-$C_{30}$ fatty methyl esters.

15. The composition of claim 13 wherein the oil is d-limonene.

16. The composition of claim 13 wherein the fatty alcohol ethoxylate is a $C_9$-$C_{11}$ alcohol ethoxylate having an average of 3 to 4 EO units.

17. The composition of claim 13 wherein the quaternized fatty amine ethoxylate is a quaternized tallowamine EO ethoxylate having an average of 8 to 20 EO units.

18. The composition of claim 13 further comprising propylene glycol.

19. The composition of claim 13 comprising 1 to 12 wt. % of the oil, 30 to 70 wt. % of the fatty alcohol ethoxylate, and 30 to 70 wt. % of the quaternized fatty amine ethoxylate.

20. A process which comprises introducing into a subterranean formation a flowback aid mixture comprising:
    (a) an oil selected from the group consisting of hydrocarbons, terpenes, and $C_6$-$C_{30}$ fatty alkyl esters;
    (b) a fatty alcohol ethoxylate; and
    (c) a quaternized fatty amine ethoxylate;
wherein the amount of oil is within the range of 1 to 12 wt. % based on the amount of flowback aid mixture, and the mixture is combined prior to or during its introduction into the formation with a naturally occurring formation brine, process water, seawater, or a combination thereof to give a microemulsion having a surface tension at 25° C. of less than 30 mN/m and a Z-average particle size as determined by dynamic light scattering at 25° C. of less than or equal to 10 nm.

* * * * *